(12) United States Patent
Gerlach et al.

(10) Patent No.: US 11,058,981 B2
(45) Date of Patent: Jul. 13, 2021

(54) INLINE WATER SEPARATORS

(71) Applicant: SIKORSKY AIRCRAFT CORPORATION, Stratford, CT (US)

(72) Inventors: Jacob R. Gerlach, Knoxville, TN (US); Chris John Biehl, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 152 days.

(21) Appl. No.: 16/317,368

(22) PCT Filed: Jul. 12, 2017

(86) PCT No.: PCT/US2017/041675
§ 371 (c)(1),
(2) Date: Jan. 11, 2019

(87) PCT Pub. No.: WO2018/013661
PCT Pub. Date: Jan. 18, 2018

(65) Prior Publication Data
US 2019/0299135 A1    Oct. 3, 2019

Related U.S. Application Data

(60) Provisional application No. 62/361,182, filed on Jul. 12, 2016.

(51) Int. Cl.
*B01D 45/00* (2006.01)
*B01D 45/16* (2006.01)
(Continued)

(52) U.S. Cl.
CPC ............. *B01D 45/16* (2013.01); *B01D 53/26* (2013.01); *B64D 13/00* (2013.01); *B64D 13/06* (2013.01);
(Continued)

(58) Field of Classification Search
CPC ........ B01D 45/16; B01D 53/26; B64D 13/00; B64D 13/06; B64D 2013/0662; B64D 2013/0688; B04C 5/103; F22B 37/32
See application file for complete search history.

(56) References Cited

U.S. PATENT DOCUMENTS 2,806,551 A * 9/1957 Heinrich .................. B04C 3/04
55/340
3,349,548 A    10/1967 Boyen
(Continued)

FOREIGN PATENT DOCUMENTS

GB         744451 A      2/1956
JP        05246395 A *   9/1993
WO      2014053865 A1    4/2014

OTHER PUBLICATIONS

International Search Report; International Application No. PCT/US2017/041675; International Filing Date: Jul. 12, 2017; dated Oct. 17, 2017; 4 Pages.
(Continued)

*Primary Examiner* — Dung H Bui
(74) *Attorney, Agent, or Firm* — Foley & Lardner LLP

(57) ABSTRACT

A water separator (108) includes a tube (112) defining a longitudinal axis, wherein the tube (112) includes a tube wall separating an interior (114) of the tube from an exterior (116) thereof. A tube insert (118) is mounted within the tube (112). The tube insert (118) includes a sheet (119) that is helically twisted about the longitudinal axis. An environmental control system (100) includes an air conditioner (102) with a discharge duct (104) for providing cooled air to an air conditioned space. A water separator (108) as described above is connected in line with the discharge duct (104) for passage of cooled air therethrough.

12 Claims, 3 Drawing Sheets

(51) Int. Cl.
    *B01D 53/26*     (2006.01)
    *B64D 13/06*     (2006.01)
    *B64D 13/00*     (2006.01)
    *B04C 5/103*     (2006.01)
    *F22B 37/32*     (2006.01)

(52) U.S. Cl.
CPC ...... *B04C 5/103* (2013.01); *B64D 2013/0662* (2013.01); *B64D 2013/0688* (2013.01); *F22B 37/32* (2013.01)

(56) References Cited

U.S. PATENT DOCUMENTS

| | | | |
|---|---|---|---|
| 3,394,533 A | | 7/1968 | Li et al. |
| 3,895,930 A | * | 7/1975 | Campolong ............. B04C 3/00 55/394 |
| 3,988,132 A | * | 10/1976 | Oranje ................... B01D 45/16 55/399 |
| 4,187,089 A | * | 2/1980 | Hodgson ................ B01D 45/18 96/412 |
| 4,263,025 A | * | 4/1981 | Godare ............. B01D 19/0015 96/189 |
| 4,311,494 A | * | 1/1982 | Conner ................. B01D 45/16 55/394 |
| 4,474,589 A | * | 10/1984 | Smolensky ............ F22B 37/32 55/337 |
| 4,783,204 A | * | 11/1988 | Roarty ..................... B04C 3/00 95/269 |
| 4,985,058 A | * | 1/1991 | Prinsloo .................... B04C 3/06 55/457 |
| 6,083,291 A | * | 7/2000 | Okada ................... B01D 45/12 55/337 |
| 6,331,195 B1 | * | 12/2001 | Faust ........................ B04C 3/06 55/396 |
| 6,540,802 B2 | * | 4/2003 | Trautmann ....... F02M 35/10059 55/337 |
| 6,540,917 B1 | * | 4/2003 | Rachels .................... B04C 3/00 210/512.1 |
| 6,752,845 B2 | * | 6/2004 | Haland .................. B01D 45/16 55/340 |
| 2003/0005719 A1 | * | 1/2003 | Mitani ................... B64D 37/32 62/402 |
| 2006/0201173 A1 | * | 9/2006 | Leathers ................. B64F 1/364 62/186 |
| 2007/0295209 A1 | * | 12/2007 | Strauser .................... B04C 3/04 95/271 |
| 2008/0006250 A1 | * | 1/2008 | Bula ....................... F02C 7/052 123/559.1 |
| 2009/0314161 A1 | * | 12/2009 | Al-Alusi ................. B04C 5/081 95/271 |
| 2011/0048696 A1 | * | 3/2011 | Holte .................... E21B 43/124 166/105.5 |
| 2011/0281716 A1 | * | 11/2011 | Hurd ...................... C22C 29/08 494/54 |
| 2012/0103423 A1 | * | 5/2012 | Schook .................... B04C 3/06 137/1 |
| 2015/0273484 A1 | * | 10/2015 | Ho .......................... B01D 45/16 55/321 |
| 2015/0306528 A1 | * | 10/2015 | Mueller .................... B04C 3/06 55/338 |
| 2016/0008752 A1 | * | 1/2016 | McKenzie ............ B01D 45/16 95/269 |
| 2016/0096129 A1 | * | 4/2016 | Kochubei .............. F01M 11/08 95/269 |
| 2016/0206169 A1 | * | 7/2016 | Hyun ..................... A47L 9/1666 |
| 2017/0030233 A1 | * | 2/2017 | Bauduin ................ B01D 45/16 |
| 2018/0126389 A1 | * | 5/2018 | Lefsrud ................. B01D 45/16 |
| 2018/0221800 A1 | * | 8/2018 | Konijn ................... B01D 45/08 |
| 2019/0009205 A1 | * | 1/2019 | Oberli ................ B01D 46/0024 |

OTHER PUBLICATIONS

Written Opinion of the International Searching Authority; International Application No. PCT/US2017/041675; International Filing Date: Jul. 12, 2017; dated Oct. 17, 2017; 6 Pages.

\* cited by examiner

INLINE WATER SEPARATORS

CROSS REFERENCE TO RELATED APPLICATIONS

This application is a National Stage application of PCT/US2017/041675, filed Jul. 12, 2017, which claims the benefit of U.S. Provisional Application No. 62/361,182, filed Jul. 12, 2016, both of which are incorporated by reference in their entirety herein.

BACKGROUND OF THE INVENTION

Field of the Invention

The present disclosure relates to environmental control systems, and more particularly to environmental control systems such as used in aircraft.

Description of Related Art

Water condensation exists in discharge ducting for air cycle environmental control systems, e.g., in air conditioning systems on board aircraft. The condensation can be considerable, and the resulting water must be drained or else it will be discharged into the cockpit or cabin, for example, where it is undesirable. Some aircraft utilize coalesce style water separators designed to collect and remove condensate from the environmental control system.

Such conventional methods and systems have generally been considered satisfactory for their intended purpose. However, there is still a need in the art for improvements in environmental control systems. The present disclosure provides a solution for this need.

SUMMARY OF THE INVENTION

An inline water separator includes a tube defining a longitudinal axis, wherein the tube includes a tube wall separating an interior of the tube from an exterior thereof. A tube insert is mounted within the tube. The tube insert dudes a sheet that is helically twisted about the longitudinal axis.

The sheet can be twisted at least 200°. The tube insert can include a plurality of mounting tabs bent 90° from the sheet for mounting the tube insert to the tube wall. The mounting tabs can be riveted to the tube wall.

A drain hole can be defined through the tube wall for draining water from condensate from the interior of the tube. A hood can partially cover over the drain hole in the interior of the tube for directing collected water toward the drain hole. A drain tube can be mounted to the tube wall about the drain hole for connecting the tube wall to a drainage system.

At least one of the tube wall and the sheet can include a mesh material. It is also contemplated that at least one of the tube wall and the sheet can include a solid sheet material.

An environmental control system includes an air conditioner with a discharge duct for providing cooled air to an air conditioned space. A water separator as described above is connected in line with the discharge duct for passage of cooled air therethrough. The water separator can be a first water separator, and the system can include a second similar water separator connected in line with the discharge duct. It is also contemplated that a coalesce style water separator can be in series between the air conditioner and the water separator.

The inline water separator can be at any point in the discharge duct, e.g., prior to the drain hole described above (relative to the direction of air flow), which drain hole is at a low point in the tube wall with the drain tube connecting the tube wall to a drainage system. The air conditioner can be mounted onboard an aircraft, and the discharge duct can terminate in a cockpit or cabin of the aircraft. The water separator can be an insert mounted within the discharge duct.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
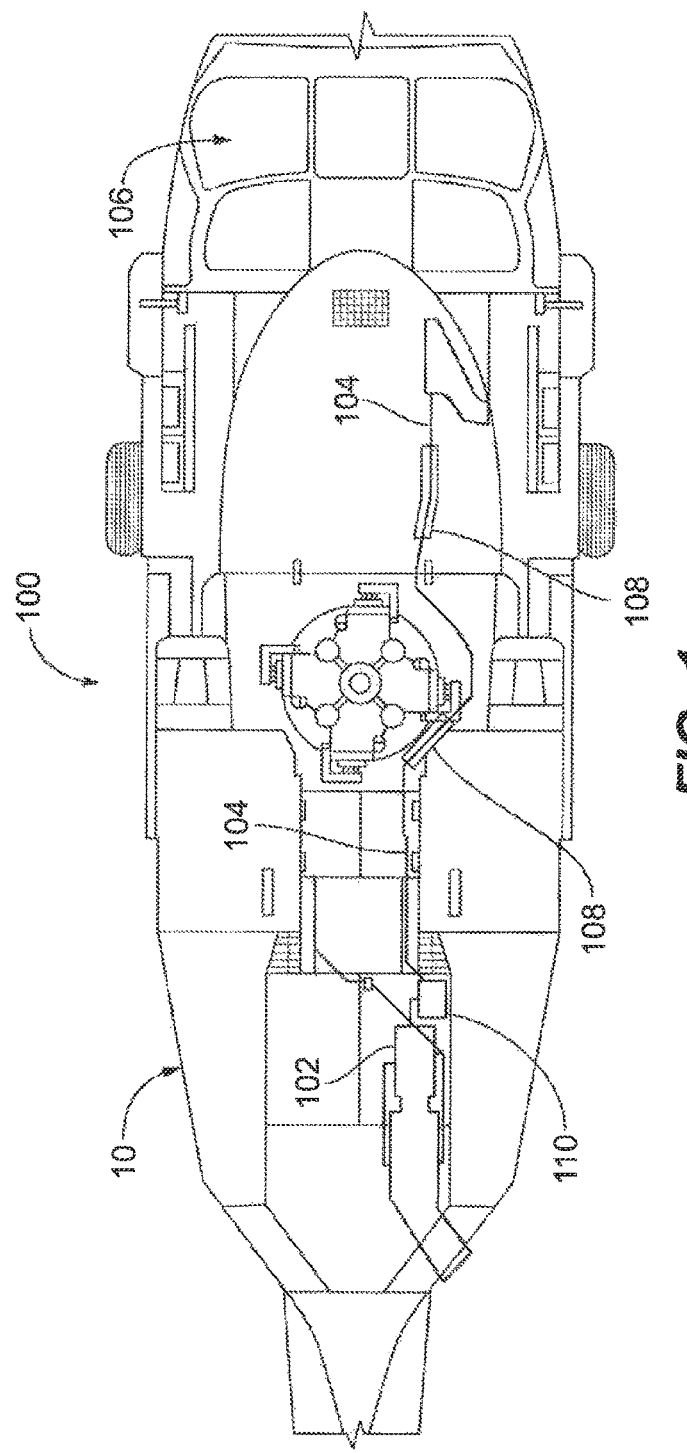
FIG. 1 is a schematic plan view of an aircraft, showing an environmental control system including two water separators constructed in accordance with an exemplary embodiment of the present disclosure.

Reference will now be made to the drawings wherein like reference numerals identify similar structural features or aspects of the subject disclosure. For purposes of explanation and illustration, and not limitation, a partial view of an exemplary embodiment of an environmental control system in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to separate water from a flow of air conditioned air.

FIG. 1 schematically shows an aircraft 10 with an onboard environmental control system 100. System 100 includes an air conditioner 102 and associated heat exchanger 103 are mounted onboard aircraft 10 with a discharge duct 104 for providing cooled air to an air conditioned space, e.g. discharge duct 104 terminates in cabin 106 of aircraft 10. Two water separators 108 are connected in line with the discharge duct 104 for passage of cooled air therethrough. Those skilled in the art will readily appreciate that any suitable number of water separators 108 can be included without departing from the scope of this disclosure. It is also contemplated that a traditional water separator 110 can be in series between the air conditioner 102 and the water separators 108, thus water separators 108 further separate water remaining after air conditioned air has had some water separated at water separator 110.

Figure 2:
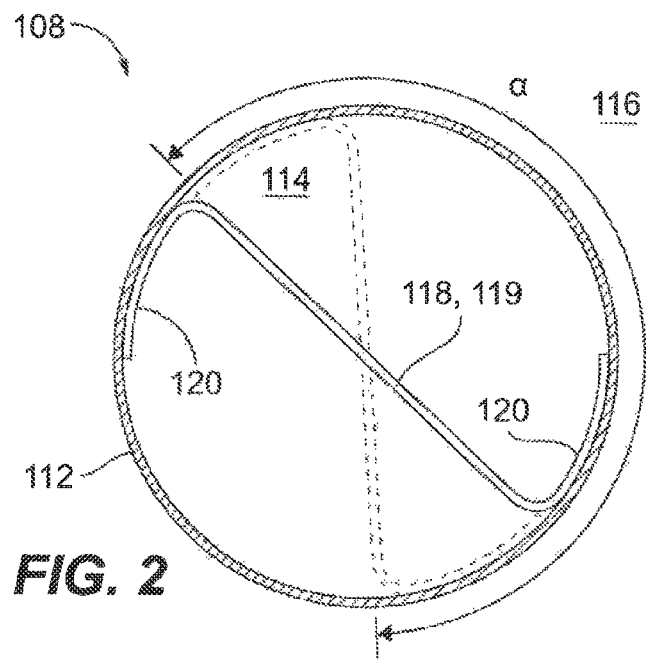
FIG. 2 is an axial end perspective view of one of the water separators of FIG. 1, showing the tube wall and the tube insert.
Figure 3:
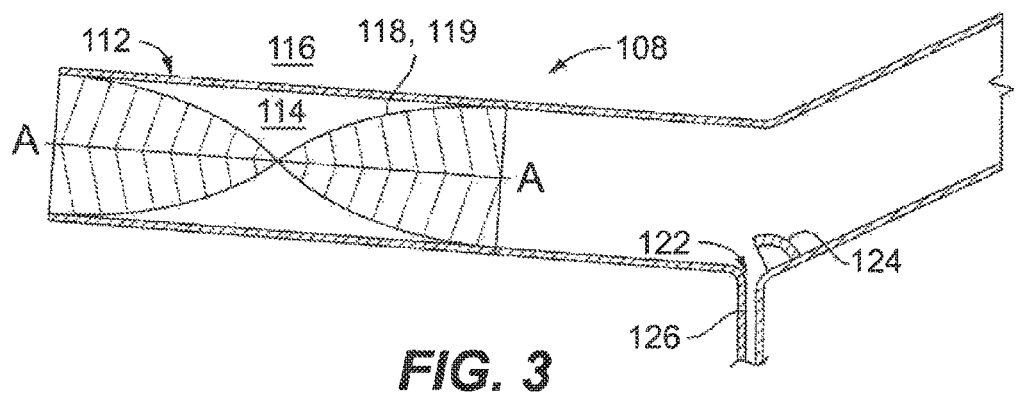
FIG. 3 is a schematic cross-sectional side elevation view of the water separator of FIG. 2, showing the helical configuration of the tube insert.

Referring now to FIG. 2, water separator 108 includes a tube 112 defining a longitudinal axis A, shown in FIG. 3. The tube 112 includes a tube wall separating an interior 114 of the tube from an exterior 116 thereof. A tube insert 118 is mounted within the tube 112. The tube insert 118 includes a sheet 119 that is helically twisted about the longitudinal axis A. The sheet can be twisted at least 200°, as indicated by angle α in FIG. 2, however any other suitable amount of twist can be used without departing from the scope of this disclosure. The tube insert 118 can include a plurality of mounting tabs 120 bent 90° from the sheet 119 for mounting the tube insert 118 to the tube wall of tube 112. The mounting tabs 120 are shown riveted to the tube wall of tube 112 in FIG. 2, however those skilled in the art will readily appreciate that any other suitable type of attachment can be used without departing from the scope of this disclosure.

With reference now to FIG. 3, a drain hole 122 is defined through the tube wall of tube 112 for draining water from condensate from the interior 114 of the tube 112. Tube insert 118 serves to slow and liquefy water in the air stream flowing through discharge duct 104. Tube insert 118 also provides a surface for condensate to form. The droplets gain weight and are centripetally thrown outward and collect to the bottom of tube 112. A hood 124 partially covers over the drain hole 112 in the interior 114 of the tube 112 for directing collected water toward the drain hole 122.

Figure 4:
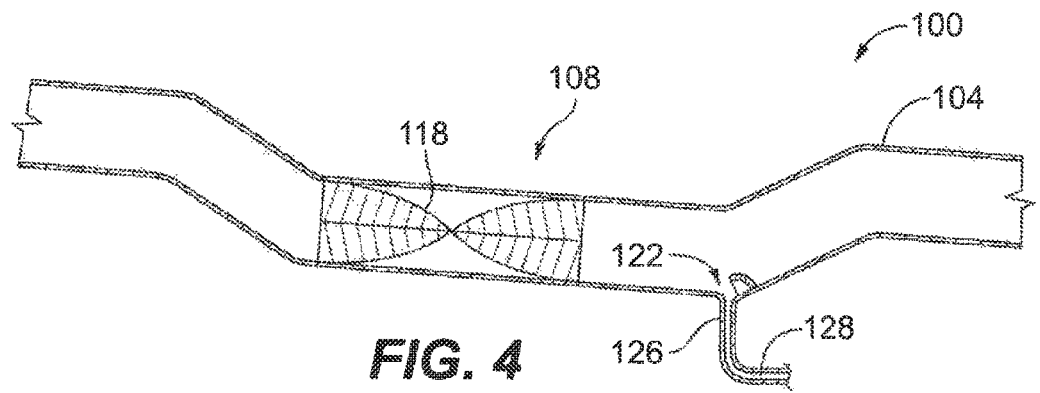
FIG. 4 is a schematic side elevation view of a portion of the environmental control system of FIG. 1 showing the water separator mounted as an insert within the air conditioner discharge duct.

With reference now to FIG. 4, the water separator 108 is an insert mounted within the discharge duct 104. The water separator 108 is positioned at a relatively low point in the discharge duct, e.g., with the drain hole 122 described above at a low point in the tube wall of tube 112 with the drain tube 126 connecting the tube wall to drainage system 128. This positioning of drain tube 126 and water separator 108 can be advantageous as it allows discharge air to pass completely through water separator 108 prior to the air reaching the drain hole 122. Drainage system 128 can lead to a heat exchanger, such as heat exchanger 103, or can lead overboard, or to any other suitable drain.

Figure 5:
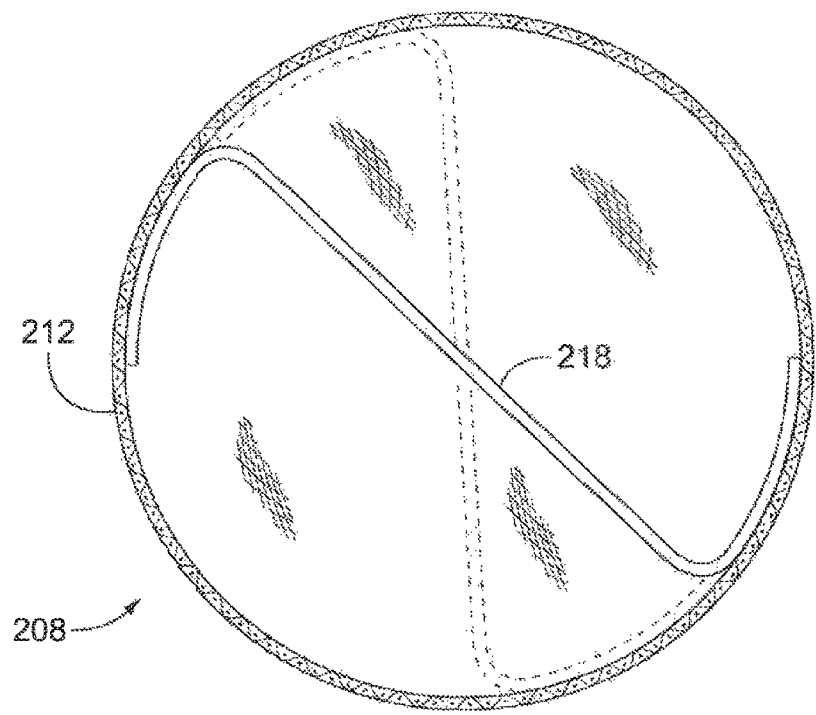
FIG. 5 is a perspective end view of another exemplary embodiment of a water separator constructed in accordance with the present disclosure, showing the tube wall and tube insert constructed of a mesh material.

As shown in FIGS. 2-4, both the tube wall of tube 112 and the sheet of tube insert 118 include a solid sheet material. However it is also contemplated that one or both of the tube wall and sheet/insert can include a mesh material. FIG. 5 shows an embodiment of a water separator 208 wherein the tube wall of tube 212 and the twisted sheet of the tube insert 218 are made of a mesh material. Those skilled in the art will readily appreciate that any sortable metallic or non-metallic materials can be used for tube 112 and tube insert 118, however metallic materials can be advantageous for improved condensate removal efficiency.

The methods and systems of the present disclosure, as described above and shown in the drawings, provide for water separation in environmental control systems with superior properties including light weight, a form factor that fits within existing ductwork, and increased amount of water separated from air conditioned air. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An environmental control system comprising:
an air conditioner with a discharge duct for providing cooled air to an air conditioned space;
a water separator connected in line with the discharge duct for passage of cooled air therethrough, wherein the water separator includes:
a tube defining a longitudinal axis, wherein the tube includes a tube wall separating an interior of the tube from an exterior thereof; and
a tube insert mounted within the tube, wherein the tube insert includes a sheet that is helically twisted about the longitudinal axis,
wherein the tube insert includes a plurality of mounting tabs structured to mount the tube insert to the tube wall, and
wherein the plurality of mounting tabs are bent from the sheet and are connected to the tube wall.

2. A system as recited in claim 1, wherein the water separator is a first water separator, wherein the system includes a second water separator connected in line with the discharge duct.

3. A system as recited in claim 1, further comprising a coalescer water separator in series between the air conditioner and the water separator.

4. A system as recited in claim 1, wherein the water separator is at a point in the discharge duct relative to an airflow direction prior to a drain hole that is defined through the tube wall for draining water from condensate from the interior of the tube, wherein the drain hole is at a low point in the tube wall, and further comprising a drain tube mounted to the tube wall about the drain hole, wherein the drain tube connects the tube wall to a drainage system.

5. A system as recited in claim 4, further comprising a hood partially covering over the drain hole in the interior of the tube for directing collected water toward the drain hole.

6. A system as recited in claim 1, wherein the air conditioner is mounted onboard an aircraft, and wherein the discharge duct terminates in a cockpit or cabin of the aircraft.

7. A system as recited in claim 1, wherein the sheet is twisted at least 200°.

8. A system as recited in claim 1, wherein the plurality of mounting tabs are bent 90° from the sheet.

9. A system as recited in claim 8, wherein the mounting tabs are riveted to the tube wall.

10. A system as recited in claim 1, wherein at least one of the tube wall or the sheet includes a mesh material, and wherein the water separator is an insert mounted within the discharge duct.

11. A system as recited in claim 1, wherein at least one of the tube wall or the sheet includes a solid sheet material, and wherein the water separator is an insert mounted within the discharge duct.

12. The system as recited in claim 1, wherein the plurality of tabs are integrally formed with the tube insert.

* * * * *